United States Patent [19]

Peroni

[11] Patent Number: 5,603,596

[45] Date of Patent: *Feb. 18, 1997

[54] LOCKING ASSEMBLY

[75] Inventor: Peter A. Peroni, Pottstown, Pa.

[73] Assignee: Lafrance Corporation, Philadelphia, Pa.

[ * ] Notice: The term of this patent shall not extend beyond the expiration date of Pat. No. 5,362,186.

[21] Appl. No.: 300,744

[22] Filed: Sep. 6, 1994

Related U.S. Application Data

[63] Continuation-in-part of Ser. No. 104,321, Aug. 9, 1993, Pat. No. 5,362,186, which is a continuation-in-part of Ser. No. 882,671, May 14, 1992, Pat. No. 5,233,870.

[51] Int. Cl.$^6$ .......................................... F16B 19/08
[52] U.S. Cl. ............................. 411/508; 411/913
[58] Field of Search ...................... 411/508, 509, 411/510, 908, 913

[56] References Cited

U.S. PATENT DOCUMENTS

| D. 293,880 | 1/1988 | Takahashi | 411/913 |
|---|---|---|---|
| 2,956,605 | 10/1960 | Rapata | 411/913 |
| 3,009,381 | 11/1961 | Rapata | 411/508 |
| 3,093,874 | 6/1963 | Rapata | 411/508 |
| 3,119,299 | 1/1964 | Sarafinas | 411/508 |
| 3,908,235 | 9/1975 | Telliard et al. | 411/508 |
| 4,534,088 | 8/1985 | Ricke | 411/913 |
| 4,708,895 | 11/1987 | Mizusawa | 411/509 |
| 4,898,493 | 2/1990 | Blankenburg | 411/508 |
| 4,973,212 | 11/1990 | Jacobs | 411/913 |
| 5,233,870 | 8/1993 | Peroni | 411/508 |
| 5,362,186 | 11/1994 | Peroni | 411/508 |

FOREIGN PATENT DOCUMENTS

| 520169 | 4/1940 | United Kingdom | 411/908 |
|---|---|---|---|
| 745788 | 2/1956 | United Kingdom | 411/908 |

*Primary Examiner*—G. Bradley Bennett
*Attorney, Agent, or Firm*—Connolly & Hutz

[57] ABSTRACT

A locking assembly used for securing an abutment member to a support member includes a locking stud having a post connected to and disposed outwardly from the abutment member. The post has a longitudinal locking blade connected to and disposed outwardly from the abutment member. The locking blade includes an outwardly disposed inclined surface terminating in a crest edge which comprises a wedge lock for being disposed against an edge of the hole in the support member. An inwardly disposed surface extends from the crest edge. The blade is deflectable at the inwardly disposed inclined surface so that the inwardly disposed inclined surface acts as a cam whereby insertion of the blade into the hole causes an edge of the hole to press against the cam and deflect the blade until the crest edge has passed beyond the hole with the wedge lock preventing removal of the stud from the hole. The post also includes a longitudinally outwardly extending base portion transversely opposite the locking blade. The base portion terminates in an outer edge which is spaced closer to the abutment member than the crest edge. An inwardly sloping surface extends outwardly from the outer edge toward the locking blade. The stud is open in the space opposite the locking blade and outwardly of the inwardly sloping surface. An indexing member secured to the abutment member secures the abutment member to the support surface at a location remote from the locking stud.

33 Claims, 2 Drawing Sheets

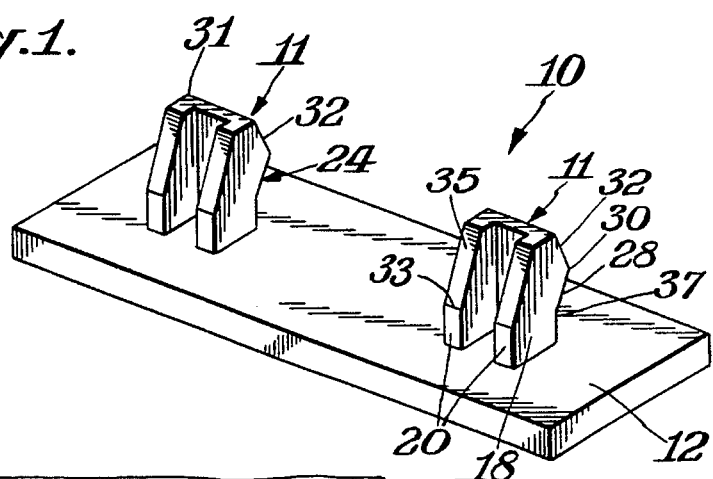
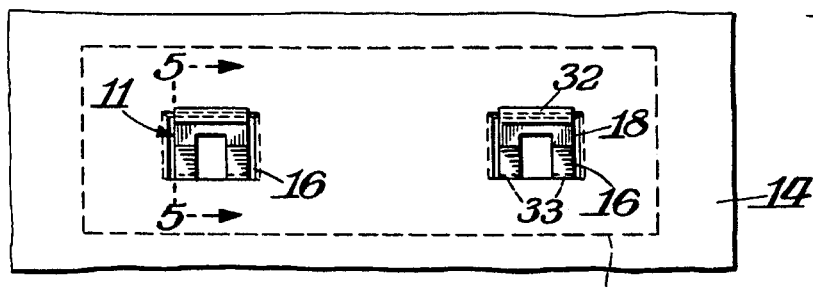
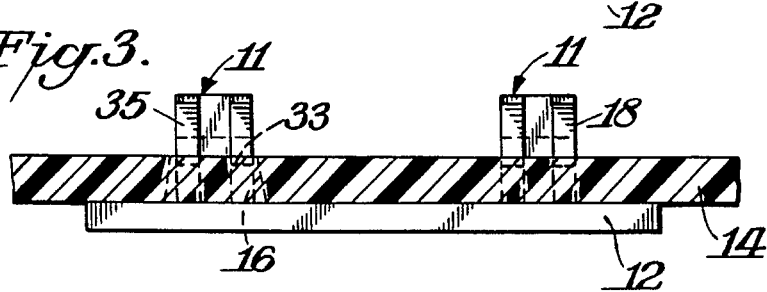
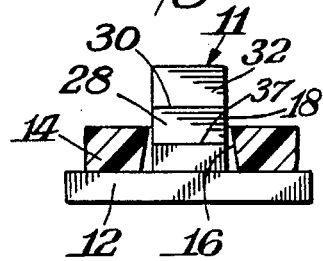
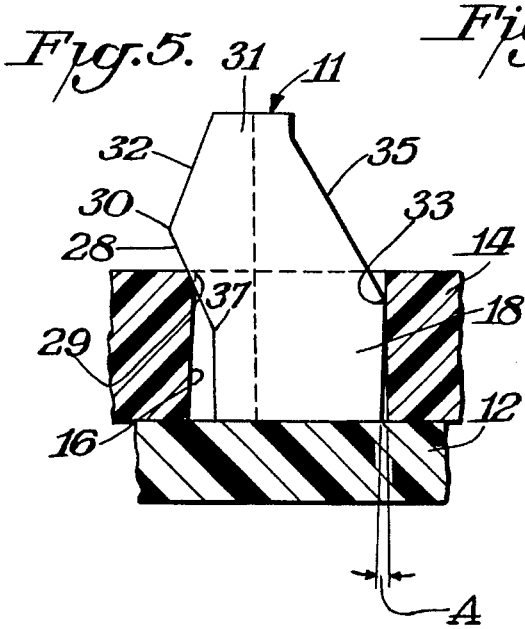
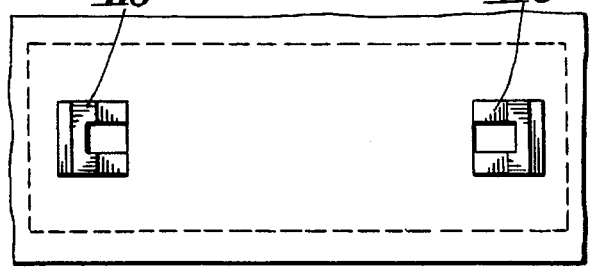
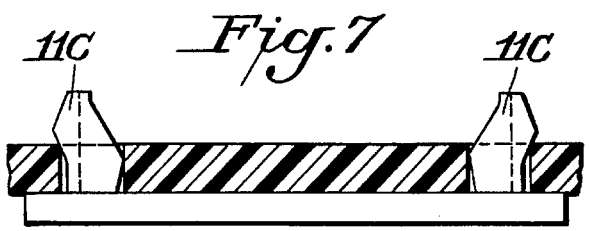

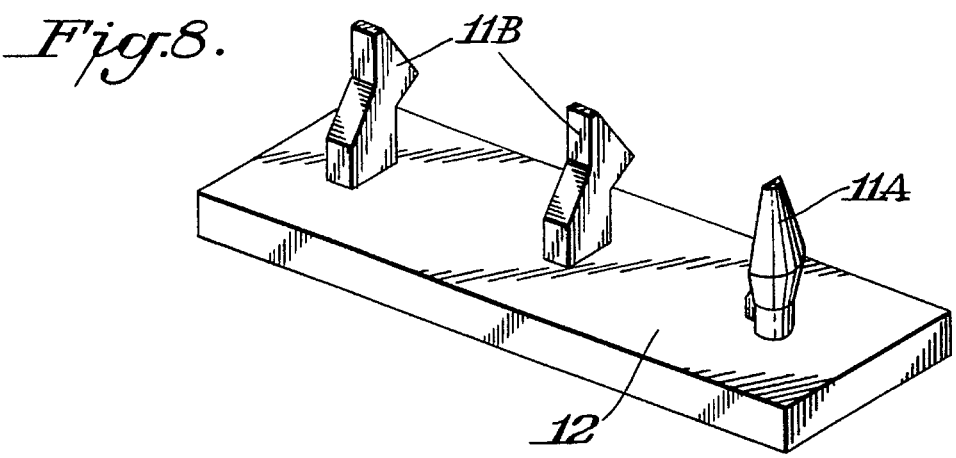
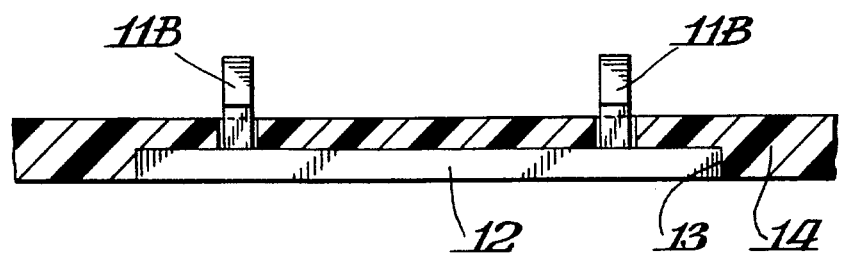
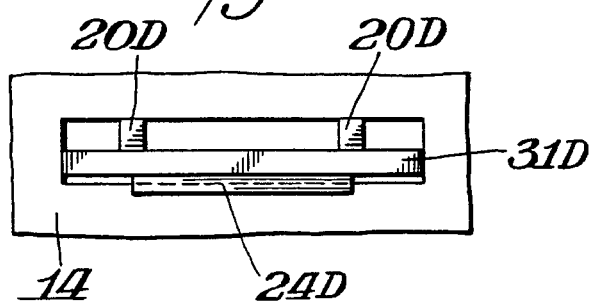
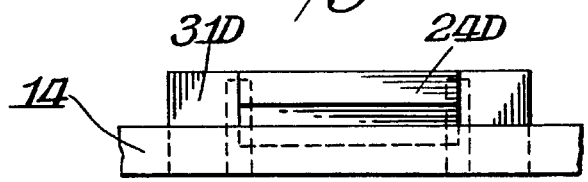
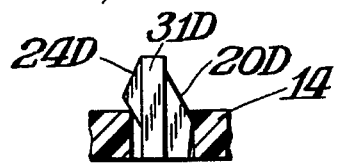

LOCKING ASSEMBLY

CROSS-REFERENCE TO RELATED APPLICATIONS

This application is a continuation-in-part of application Ser. No. 08/104,321, filed Aug. 9, 1993, now U.S. Pat. No. 5,362,186, which in turn is a continuation-in-part of application Ser. No. 07/882,671, filed May 14, 1992, now U.S. Pat. No. 5,233,870.

BACKGROUND OF THE INVENTION

There are various applications where it is necessary to mount a member such as a plate to another member. For example, propane tank holders are provided with plates to indicate the level of propane in the tank. Generally, such plates are mounted to the tank holder by a locking stud arrangement. A conventional form for each such locking stud is to provide a post having an axial slot thereby creating a pair of side by side spaced blades of split pin form. In practice it is necessary to accurately position the blade for fitting into the propane tank holder which functions as a support member for the plate. Where the plate includes a plurality of such studs, extreme care must be taken to be sure that all of the studs are properly aligned with corresponding holes. Even where there is proper insertion, however, such arrangements are not completely effective because the material can cold flow after insertion which would decrease the effectiveness of its holding ability even to the point of ceasing to hold the plate in place.

A further disadvantage with the conventional slip pin type locking stud is the difficulty in tooling with respect to the problems of collapsing the core.

A further application is in the mounting of nameplates to various objects. In such uses it would be desirable if the nameplate could be easily mounted in place and yet mounted in such a manner that an effectively tight fit results.

The above indicated parent application and parent patent disclose various techniques for overcoming the above disadvantages and meeting the above needs.

SUMMARY OF THE INVENTION

An object of this invention is to provide a locking stud arrangement of the general type disclosed in the above noted parent application and parent patent.

In accordance with this invention a locking assembly is provided which includes a locking stud having a post connected to and disposed outwardly from an abutment member. The post has a longitudinal locking blade connected to and disposed outwardly from the abutment member. The locking blade includes an outwardly disposed inclined surface terminating in a crest edge. The inclined surface functions as a wedge lock for being disposed against the edge of a hole in a support member to which the abutment member is secured. An inwardly disposed inclined surface extends from the crest edge. The blade is deflectable at the inwardly disposed inclined surface so that the inclined surface functions as a cam to facilitate the insertion of the blade into the hole whereby an edge of the hole presses against the cam to deflect the blade until the crest edge has passed beyond the hole with the wedge lock preventing removal of the stud from the hole. The post also includes a longitudinally outwardly extending base portion transversely opposite the locking blade. The base portion terminates in an outer edge which is spaced from the abutment member by a distance less than the distance that the crest edge is spaced from the abutment member. An inwardly sloping surface extends outwardly from the outer edge of the base member toward the locking blade. The stud is open in the space opposite the locking blade and outwardly of the inwardly sloping surface. An indexing member is secured to the abutment member on the same side of the abutment member as the locking stud for securing the abutment member to the support member at a location remote from the locking stud.

The base portion may taper outwardly at least slightly to accommodate any debris that may accumulate such as during insertion of the locking stud into the hole.

The post may have an arcuate cross section as in the parent patent or a rectangular cross section as in the parent application.

The post may include two spaced parallel base portions which are connected to the locking blade whereby the post has a generally U-shaped cross-section.

The outer edge of the base portion should extend at least as far the outer edge of the hole in the support member but never beyond the outer edge of the hole. The support member may include a recess into which the abutment member may fit. The abutment member may be a nameplate.

THE DRAWINGS

FIG. 1 is a perspective view of a double locking post locking assembly in accordance with this invention;

FIG. 2 is a top plan view of the locking assembly shown in FIG. 1;

FIG. 3 is a front elevational view of the locking assembly shown in FIGS. 1–2;

FIG. 4 is a rear elevational view of one of the locking studs in the locking assembly of FIGS. 1–3;

FIG. 5 is a cross-sectional view taken along the line 5—5 of FIG. 2;

FIG. 6 is a top plan view similar to FIG. 2 of a modified form of this invention;

FIG. 7 is a side elevational view partly in section of the embodiment shown in FIG. 6;

FIG. 8 is a perspective view of a modified form of locking assembly in accordance with this invention;

FIG. 9 is a cross-sectional view showing yet another modified form of locking assembly in accordance with this invention;

FIG. 10 is a top plan view of yet another embodiment of this invention;

FIG. 11 is a side elevational view of the embodiment shown in FIG. 10; and

FIG. 12 is a right end elevational view of the embodiment shown in FIGS. 10–11.

DETAILED DESCRIPTION

The present invention is directed primarily to variations of the locking assemblies disclosed in parent application Ser. No. 08/104,321 and its parent U.S. Pat. No. 5,233,870. The details of both the parent application and the parent patent are incorporated herein by reference thereto. Accordingly, the present application will refer to the details of the parent application and the parent patent solely as is necessary for an understanding of such variations.

As disclosed in parent U.S. Pat. No. 5,233,870 the single post stud with a locking blade is of generally arcuate form wherein the post is cylindrical and has a cylindrical cross-section and the wedge and cam portions are also arcuate. The locking assembly of that patent is particularly effective for use in correspondingly shaped circular holes. The parent application Ser. No. 08/104,321 describes variations wherein it is not necessary to utilize circular or arcuate surfaces and wherein the locking assembly may be used for insertion through non-circular holes. These shape variations may be used with the present invention.

FIGS. 1–5 illustrate a locking assembly 10 in accordance with this invention. As shown therein locking assembly 10 includes spaced locking studs 11 which are completely separate from each other and incorporate generally the principles of the above noted parent application and parent patent. Thus, the locking assembly 10 includes an abutment member or carrier 12. Each locking stud 11 has a post 18 connected to and disposed outwardly from the abutment member 12. Post 18 includes a locking blade 24 with a pair of spaced parallel base portions 20 transversely opposite the locking blade 24. The base portions 20 are interconnected by the locking blade whereby the post 18 has a U-shaped cross-section.

FIG. 5 best illustrates the structure of the locking blade 24 as it cooperates with each of the base portions 20. As shown therein the locking blade 24 has an outwardly disposed inclined surface 28 terminating in a crest edge 30. The outwardly disposed inclined surface 28 comprises a wedge lock which is disposed against an edge 29 of hole 16 in the support member 14. An inwardly exposed inclined surface 32 extends outwardly from crest edge 30 toward the tip 31 of post 18. The blade 24 is deflectable at the inwardly disposed inclined surface 32. As described in the parent application and parent patent when the blade is inserted into the hole 16 the edge 29 of the hole 16 presses against the cam surface 32 to deflect the blade until the crest edge 30 has passed beyond the hole 16. The wedge lock surface 28 then prevents removal of the locking stud 11 from the hole.

FIG. 5 illustrates the details of one of the base portions 20. As shown therein base portion 20 extends outwardly from abutment member 12 and terminates at its widest portion in an outer edge 33. Outer edge 33 is spaced from abutment member 12 by a distance less from the distance from which crest edge 30 is spaced from abutment member 12. An inwardly sloping surface 35 extends from outer edge 33. Inclined surfaces 32 and 35 extend from central section 31. As illustrated in FIG. 5 the stud is open in the space opposite the locking blade and outwardly of the inwardly sloping surface 35. In accordance with the practices of the parent application and the parent patent, the locking blade may be disposed on one side of and spaced from a plane perpendicular to the abutment surface which bisects post 18. The stud may be considered completely open in the space opposite the locking blade creating an air space over the entire volume of the stud outwardly of the post and inwardly of the locking blade.

As noted one of the characteristics in the location of outer edge 33 is that it is disposed closer to abutment member 12 than the crest edge 30. A further characteristic which is shown in FIG. 5 is that the outer edge 33 does not extend laterally or transversely beyond the outer edge of the hole 16. This is necessary to provide sufficient clearance for the locking blade to pass through the hole 16 so that the surface 28 may form a wedge lock. A further characteristic in the location of outer edge 33 is that it is always outwardly beyond the inner edge 37 which marks the transition area where outwardly inclined wall 28 begins to slope. Although outer edge 33 may extend beyond hole 16, it is preferable that outer edge 33 remain within hole 16.

Base portion 20 may extend perpendicularly from abutment member 12 until it reaches the outer wall of support 14. In the preferred practice of the invention, however, there is a slight taper to base portion 20 as indicated by the angle A. This slight taper creates a space into which debris may collect particularly where debris is created during the insertion of the locking stud into the support member.

In accordance with the teachings of the parent application and parent patent, an indexing member would also be secured to abutment member 12 on the same side of abutment member 12 as locking stud 11. Such an arrangement thereby secures the abutment member to the support member 14 at a location remote from the locking stud. The invention may be broadly practiced where one of the base portions 20 in connection with its associated segment of the locking blade may be considered as the indexing member and where the other base portion and its associated segment of the locking blade may be considered as the initial locking stud. In the preferred practice of the invention, however, a completely separate and spaced indexing member is used. In this preferred practice of the invention the indexing member is also a locking stud although a simple pin or post may serve the function of an indexing member.

FIG. 1 illustrates the locking assembly 10 to include two locking studs 11,11 whereby each locking stud could function as the indexing member for the other locking stud.

If desired, each locking stud may be made of arcuate surfaces such as locking stud 11A in FIG. 8 which is formed along the same principles as the parent patent.

The locking stud may also include only a single base portion 20, such as indicated by locking studs 1ib of FIG. 6 which are formed along the principles of the above noted parent application. Locking studs 1ib have a rectangular cross-section. Locking studs 11B and 11 have in common the use of flat surfaces rather than arcuate surfaces. These flat or straight surfaces are particularly advantageous in that the holes could be in the form of over sized slots.

It is to be understood that the invention may be practiced with any number of locking studs on the abutment member. Similarly, the various types of locking studs may be mixed or matched. Thus FIG. 1 illustrates two identical locking studs, while FIG. 8 illustrates two different types of locking studs. FIG. 1 also shows only two locking studs on a single abutment member, while FIG. 8 illustrates three locking studs. Any number of such locking studs may be used in accordance with the practice of this invention.

FIGS. 6–7 illustrate a modification of the embodiment shown in FIG. 1. In this respect, FIG. 1 illustrates the locking studs 11,11 to be parallel with each other and to extend in the same direction. FIGS. 6–7 illustrate the locking studs 11C,11C to be aligned with each other but extending in opposite directions. Thus the base portions are disposed toward each other while the locking blades are disposed remote from each other in the embodiment of FIGS. 6–7.

FIGS. 10–12 illustrate yet another variation of the invention wherein the base portions 20D,20D are spaced from each other but are interconnected by a common central portion 31D which extends outwardly beyond each base portion 20D. A single locking blade 24D is provided on central portion 31D. Locking blade 24D could extend the entire length of central portion 31D or as illustrated could extend only over a portion of its length centered on central portion 31D. Alternatively, there could be a plurality of spaced locking blades extending from central portion 31D. In the embodiment of FIGS. 10–12 each of the base portions 20D may be considered as the indexing member for the other of the base portions.

FIG. 3 illustrates the locking assembly 10 to be used for mounting an abutment member 12 against but outwardly of the support member 14. FIG. 9 illustrates a variation which is particularly useful for nameplate wherein the carrier or support member 14 has a recess 13 into which the nameplate or abutment member 12 fits so that the outer surface of abutment member 12 is flush with the outer surface of support member or carrier 14 while locking studs 11B,11B extend through carrier 14.

As indicated in the parent application the locking assembly may be used for securing an abutment member to a plurality of carriers. Other variations in the practice of this invention will be obvious given the suggestions of this invention.

What is claimed is:

1. A locking assembly for securement through a hole in a support member comprising an abutment member, a locking stud having a post connected to and disposed outwardly from said abutment member, said post having a tip remote from said abutment member, said post having a longitudinal locking blade connected to and disposed outwardly from said abutment member, said locking blade including an outwardly disposed inclined surface terminating in a crest edge, said outwardly disposed inclined surface comprising a wedge lock for being disposed against an edge of the hole in the support member, an inwardly disposed inclined surface extending from said crest edge, said blade being laterally movable as said blade passes through the hole, said inwardly disposed inclined surface comprising a cam whereby insertion of said blade into the hole causes an edge of the hole to press against said blade permit said crest edge to pass longitudinally and laterally beyond the hole with said wedge lock preventing removal of said stud from the hole, said post including a longitudinally outwardly extending base portion transversely opposite said locking blade, said base portion terminating in an outer edge, said outer edge being spaced from said abutment member by a distance less than the distance said crest edge is spaced from said abutment member, an inwardly sloping surface extending outwardly from said outer edge toward said tip of said post, said stud being open in the space opposite said locking blade and outwardly of said inwardly sloping surface, and an indexing member secured to said abutment member on the same side of said abutment member as said locking stud securing said abutment member to said support member at a location remote from said locking stud.

2. The locking assembly of claim 1 wherein said outwardly disposed inclined surface begins to slope away from said post at an inner edge on said post, and said outer edge of said base portion extending beyond said abutment member a distance greater than the distance of said inner edge from said abutment member.

3. The locking assembly of claim 1 wherein said base portion tapers outwardly away from said abutment member.

4. The locking assembly of claim 1 wherein said post has an arcuate cross-section.

5. The locking assembly of claim 1 including two of said base portions connected to each other by said locking blade.

6. The locking assembly of claim 5 wherein there is a single one of said locking blades, said base portion being parallel to each other, and said posts having a U-shaped cross-section.

7. The locking assembly of claim 6 wherein said locking stud is a first locking stud, and said indexing member comprising a second locking stud.

8. The locking assembly of claim 7 wherein said second locking stud has the same structure as said first locking stud.

9. The locking assembly of claim 7 wherein said post of said second locking stud is of arcuate cross-section.

10. The locking assembly of claim 5 wherein one of said base portions is said indexing member.

11. The locking assembly of claim 1 wherein said post is of rectangular cross-section.

12. The locking assembly of claim 11 wherein said locking stud is a first locking stud, and said indexing member comprising a second locking stud.

13. The locking assembly of claim 12 wherein said second locking stud has the same structure as said first locking stud.

14. The locking assembly of claim 12 wherein said post of said second locking stud is of arcuate cross-section.

15. The locking assembly of claim 1 wherein said locking stud is a first locking stud, and including a second locking stud mounted to said abutment member.

16. The locking assembly of claim 15 wherein said indexing member is a third locking stud.

17. The locking assembly of claim 16 wherein said second locking stud is of the same structure as said first locking stud.

18. The locking assembly of claim 17 wherein said third locking stud is of different structure than said first locking stud.

19. The locking assembly of claim 18 wherein said posts or said first locking stud and of said second locking stud are each of rectangular cross-section, and said posts of said third locking stud being of arcuate cross-section.

20. The locking assembly of claim 15 wherein said locking studs are parallel to each other and disposed in the same direction as each other.

21. The locking assembly of claim 15 wherein said locking studs are aligned with each other and disposed in an opposite direction to each other with said locking blades remote from each other.

22. The locking assembly of claim 1 including two of said base portions connected to each other by a central portion, and at least one locking blade extending outwardly from said central portion.

23. The locking assembly of claim 22 wherein one of said base portions comprises said indexing member.

24. The locking assembly of claim 1 in combination with a support member having a hole for said locking stud, and said outer edge extending laterally a distance no greater than the edge of said hole.

25. The combination of claim 24 wherein said base portion is at least as long as the length of said hole, and said outer edge extending to at least the outer edge of said hole.

26. The combination of claim 24 wherein said support member has an outer wall remote from said locking stud, a recess being in said outer wall, said abutment member fitting in said recess, and said abutment member having an outer wall flush with said outer wall of said support member.

27. The combination of claim 26 wherein said hole is an oversized slot.

28. The combination of claim 27 wherein said post is of rectangular cross-section.

29. The combination of claim 26 wherein said abutment member is a nameplate.

30. A locking assembly for securement through a hole in a support member comprising an abutment member, a locking stud having a post connected to and disposed outwardly from said abutment member, said post having a tip remote from said abutment member, said post having a longitudinal locking blade connected to and disposed outwardly from said abutment member, said locking blade including an outwardly disposed inclined surface terminating in a crest edge, said outwardly disposed inclined surface comprising a wedge lock for being disposed against an edge of the hole in the support member, an inwardly disposed inclined surface extending from said crest edge, said blade being laterally movable as said blade passes through the hole, said inwardly disposed inclined surface comprising a cam whereby insertion of said blade into the hole causes an edge of the hole to press against said blade and permit said crest edge to pass longitudinally and laterally beyond the hole with said wedge lock preventing removal of said stud from the hole, said post including a longitudinally outwardly extending base portion transversely opposite said locking blade, said base portion terminating in an outer edge, said outer edge being spaced from said abutment member by a distance less than the distance said crest edge is spaced from said abutment member, an inwardly sloping surface extending outwardly from said outer edge toward said tip of said post, said stud being open in the space opposite said locking blade and outwardly of said inwardly sloping surface, said outwardly disposed inclined surface beginning to slope away from said post at an inner edge on said post, and said outer edge of said base portion extending beyond said abutment member a distance greater than the distance of said inner edge from said abutment member.

31. A locking assembly for securement through a hole in a support member comprising an abutment member, a locking stud having a post connected to and disposed outwardly from said abutment member, said post having a tip remote from said abutment member, said post having a longitudinal locking blade connected to and disposed outwardly from said abutment member, said locking blade including an outwardly disposed surface terminating in a crest edge, said outwardly disposed surface comprising a lock for being disposed at an edge of the hole in the support member, an inwardly disposed inclined surface extending from said crest edge, said blade being laterally movable as said blade passes through the hole, said inwardly disposed inclined surface comprising a lead-in surface whereby insertion of said blade into the hole causes an edge of the hole to press against said blade and permit said crest edge to pass longitudinally and laterally beyond the hole with said outwardly disposed lock surface preventing removal of said stud from the hole, said post including a longitudinally outwardly extending base portion transversely opposite said locking blade, said base portion terminating in an outer edge, said outer edge being spaced from said abutment member by a distance less than the distance said crest edge is spaced from said abutment member, an inwardly sloping surface extending outwardly from said outer edge toward said tip of said post, said stud being open in the space opposite said locking blade and outwardly of said inwardly sloping surface, and an indexing member secured to said abutment member on the same side of said abutment member as said locking stud securing said abutment member to said support member at a location remote from said locking stud.

32. The locking assembly of claim 31 wherein said outwardly disposed surface is inclined.

33. The locking blade of claim 31 wherein said inwardly disposed surface is planar.

\* \* \* \* \*